Patented Mar. 7, 1944

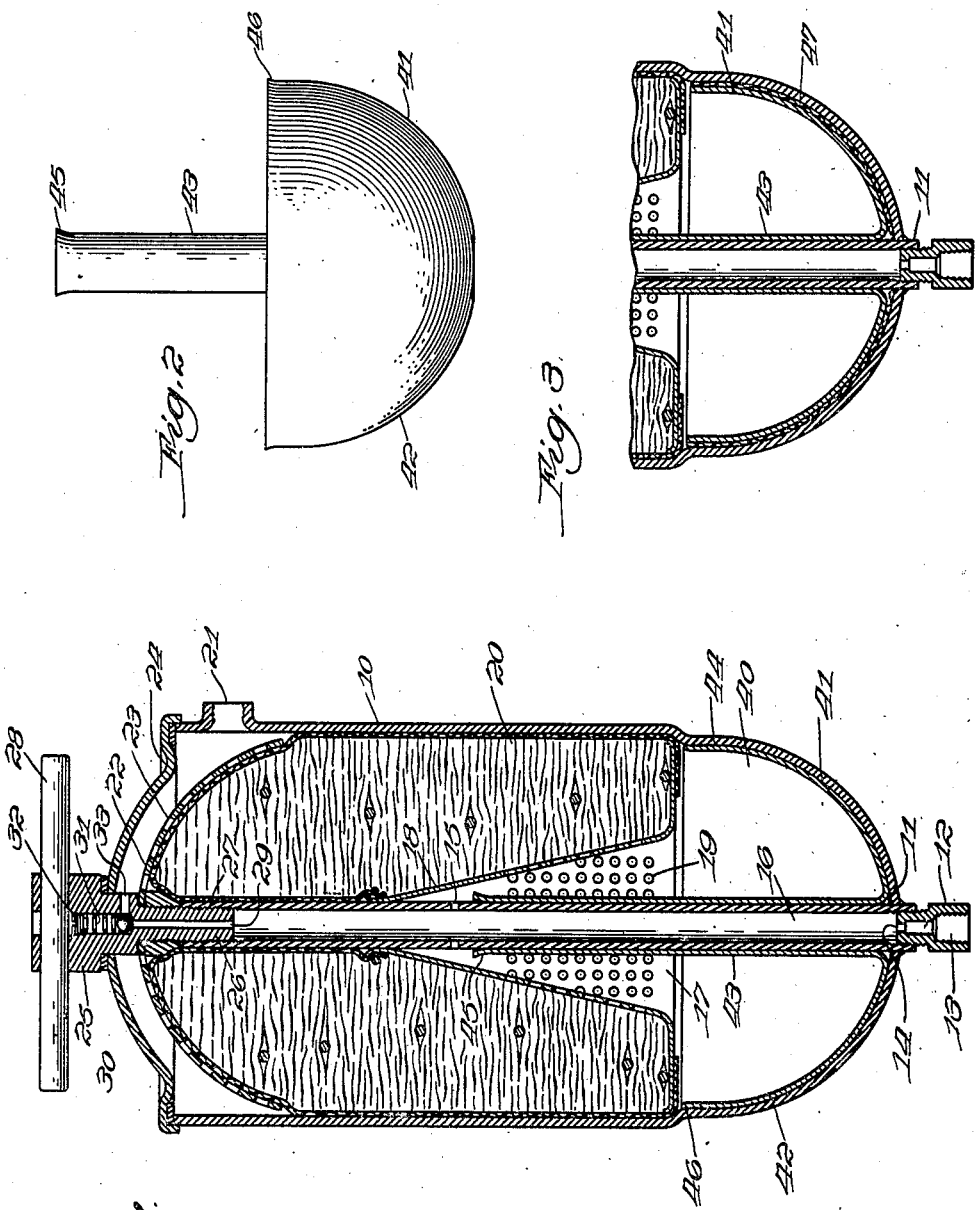

2,343,636

UNITED STATES PATENT OFFICE 2,343,636

OIL FILTER

Cecil N. Bentley, Toledo, Ohio, assignor to De Luxe Products Corporation, a corporation of Indiana Application September 3, 1940, Serial No. 355,249

2 Claims. (Cl. 210—140)

This invention relates to an oil filter and more particularly to an oil filter including a removable sump element. The invention is intended primarily for use in filters of the type shown in Hurn Patent 2,168,124, issued August 1, 1939.

The invention is illustrated in the drawing, in which Figure 1 is an elevation, mostly in section, of the preferred form of filter; Figure 2 is an elevational view of the removable sump element; and Figure 3 is a sectional elevation of the lower portion of a modified form of filter.

The filter comprises a metal housing 10 provided with a central metallic tube 11 extending upwardly from the bottom to approximately the top of the housing. At the bottom the central tube is provided with an inlet adapter 12 which is provided with an opening 13 for the ingress of oil from the oil circulation system of an engine or other oil circulating device. At the other end the adapter is provided with a measuring orifice 14 which determines the amount of oil entering the tube 11 and establishes a pressure drop under normal operating conditions between the pressure inlet tube and the pressure in the oil-circulating system.

The tube is provided near the center of the housing with a pair of oil-feeding orifices 15 for feeding oil from the central chamber 16 of the tube into the main chamber 17 of the filter. These oil-feeding orifices direct the oil in a rapidly moving stream against the upper walls of a rigid cone 18. The cone is provided at a lower portion with a number of openings 19 through which oil passes into the filtering material 20. This material may be any absorbent material which is so constructed or supported that it will not substantially compress under normal operating pressures of the oil system. The oil passes upwardly through the filter and out of the oil exit 21. The top of the filter material is held in position by a rigid cover 22 provided with perforations 23. The filter housing is provided with a removable cover 24 in the center of which is a locking device 25 provided with a screw-threaded extension 26 which fits into the upper portion 27 of the tube 11. By turning the handle 28 the tube housing cover and locking device are secured together and the cap 22 is pressed down upon the cartridge.

The locking member 25 is provided with a drilled conduit 28 which passes centrally through the extension 26 and is normally closed by a ball valve 30 held in engagement by the spring 31. The spring 31 may be adjusted by the screw 32 so that the valve 30 will open whenever the pressure in the chamber 16 exceeds a predetermined maximum. When the valve 30 opens oil may pass from the chamber 16 through the conduit 29 and the connecting conduit 33 to the oil exit 21.

The housing 10 is enlarged at the bottom to produce a large sump chamber 40. In the operation of the filter the sump chamber is quiescent and any major impurities which are in the oil or which accumulate on the walls of the cone 18 are ultimately carried by gravity to the bottom of the sump chamber 40. These accumulations are considerable and should be removed whenever the cartridge 20 is changed. Heretofore the sump chamber has been provided with an orifice through which these impurities might be drained. However, it has proved difficult in view of the limited space adjacent to an automobile engine adequately to control the discharge of oil and impurities from the sump chamber, and as a result if an attempt was made to drain the sump through the sump opening the usual result was to deposit most of the impurities upon the filter connections, the engine block, or the hands and arms of the person attempting to drain the sump. In practice, therefore, many users either did not drain the sump or would attempt to clean it by the use of cloths inserted into the filter housing from the top. Neither of these remedies is satisfactory from the standpoint of the operation of the filter. The attempt to use cloths to clean out the sump has also the disadvantages that oil and dirt are likely to be deposited upon the car and it is almost impossible to avoid contamination of the hands and clothing of the operator.

All of these difficulties are overcome in the present invention by the provision within the sump chamber of a removable sump element 41 which consists of a substantially rigid cup-shaped member, preferably of light metal, the bottom portion 42 of which is shaped to fit the lower portion of the housing and the center of which is upturned and extended in a tube 43 which fits closely about the tube 11 of the filter. The side walls 44 of the removable sump extend substantially to the bottom of the cartridge. The top 43 extends preferably substantially to the openings 15 and the top of the tube is flared slightly at 45 to provide a flange suitable for gripping the element when removing it.

When changing a filter provided with the removable sump element the top of the housing is removed and the filter cartridge extracted.

after which the removable sump element may oe grasped by the flange 45 and drawn upwardly along the central tube 11 and removed from the housing. The flange 45 is well above the oil level in the housing after the removal of the filter, and inasmuch as all of the impurities are at the bottom of the sump it is immaterial if the oil level in the housing is slightly above the edges 46 of the cup-shaped portion of the removable element. In most cases, however, the oil will not extend above the edges 46.

In Figure 3 is shown a modified form of structure in which a removable fabric lining 47 is provided in the lower portion of the housing between the sump member 41 and the wall of the housing. This fabric lining permits the use of a removable sump element of a less close fit and without the danger of seepage of any dirt below the removable element, which might build up in time to interfere with the proper seating thereof.

It is obvious that the element may be altered to suit the characteristics of the filter housing and may be provided with any suitable means for engagement with the cartridge if desired. In general, however, it is preferred to have an upstanding central extension of the sump member to provide a convenient means for removing it from the housing.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In an oil filter, a housing, means for introducing oil thereto including an oil entrance, means for withdrawing oil therefrom including an oil exit, a filtering means between the oil entrance and the oil exit, a sump chamber in the housing below the filtering means, means for supporting the filtering means in the housing above the sump chamber, a removable cup shaped open top sump element independent of the housing and the filtering means within the sump chamber, said element being freely removable after removal of the filtering means and having a central upstanding tubular member extending above its edges, and a fabric lining between the housing and the removable sump element.

2. In an oil filter, a housing, means for introducing oil to the housing including an oil entrance, means for removing oil from the housing including an oil exit, a tube centrally located in the housing and extending upwardly from the bottom thereof, a filtering cartridge about the tube and between the oil entrance and oil exit said filtering cartridge having an open bottom permitting the drainage of sediment therefrom, a sump chamber in the housing below the filter cartridge, means for supporting the filtering cartridge in the housing above the sump chamber and a cup-shaped removable sump element independent of the housing and the filtering cartridge substantially filling the sump chamber and provided with an open top central tubular member adapted to enclose the tubular member in the housing and provided at an upper portion thereof with grasping means extending above the edges of the sump element said grasping means closely fitting the central tube in the housing and being sufficiently small in cross section that the grasping means do not interfere with the drainage of sediment from the filter cartridge.

CECIL N. BENTLEY.